United States Patent [19]
Ugai et al.

[11] Patent Number: 5,537,882
[45] Date of Patent: Jul. 23, 1996

[54] SEMICONDUCTOR SENSOR FOR DETECTING PHYSICAL AMOUNT WITHOUT THERMAL HYPSTERESIS WHERE OUTPUT WIRING IS DISPOSED IN A STRESS INSENSITIVE DIRECTION

[76] Inventors: Seiichi Ugai, 20-1, Mizukicho-2-chome; Satoshi Shimada, 4-22, Minamikoyacho-3-chome, both of Hitachi-shi; Susumu Murakami, 3271-110, Nakane, Katsuta-shi; Yoshimi Yamamoto, 722-7, Godai, Nakamachi, Naka-gun, Ibaraki-ken; Yukio Takahashi, 3600-76, Nakane, Katsuta-shi; Yasuo Maruyama, 60-23, Shimotakimachi, Takasaki-shi, all of Japan

[21] Appl. No.: 317,156

[22] Filed: Oct. 3, 1994

[30] Foreign Application Priority Data

Oct. 5, 1993 [JP] Japan .................................. 5-249042

[51] Int. Cl.$^6$ .............................. G01L 9/06; G01P 15/09; H01C 10/10
[52] U.S. Cl. .................................. 73/727; 73/721; 73/708; 73/514.34; 338/42
[58] Field of Search ................................. 73/517 R, 708, 73/721, 727; 324/71.5; 338/2–5, 42

[56] References Cited

U.S. PATENT DOCUMENTS

| | | | |
|---|---|---|---|
| 4,530,244 | 7/1985 | Starr | 73/721 X |
| 4,739,381 | 4/1988 | Miura et al. | 357/26 |
| 4,884,051 | 11/1989 | Takahashi et al. | 338/4 |
| 4,967,605 | 11/1990 | Okada | 73/517 R X |
| 5,172,205 | 12/1992 | French et al. | 73/727 X |
| 5,259,248 | 11/1993 | Ugai et al. | 73/727 X |

FOREIGN PATENT DOCUMENTS 36674  1/1991  Japan .

Primary Examiner—Richard Chilcot
Assistant Examiner—Joseph L. Felber
Attorney, Agent, or Firm—Kenyon & Kenyon

[57] ABSTRACT

A sensor for detecting physical amount in which a gauge resistance value is made not to change even when a wiring material presents a yield phenomenon by wiring a wiring material Such as aluminum presenting a yield phenomenon by thermal stress in a stress insensitive direction of a piezogauge.

18 Claims, 10 Drawing Sheets

(001) PLANE

SEMICONDUCTOR SENSOR FOR DETECTING PHYSICAL AMOUNT WITHOUT THERMAL HYPSTERESIS WHERE OUTPUT WIRING IS DISPOSED IN A STRESS INSENSITIVE DIRECTION

BACKGROUND OF THE INVENTION

The present invention relates to a characteristic amount sensor, and more particularly to a piezoresistance type pressure sensor or the like used for process control and an acceleration sensor or the like used for automobiles, etc.

It is known that a zero point of a sensor output shows hysteresis, when gauge resistors provided on a semiconductor substrate are wired such that, for example, an aluminum wiring provided on a pressure sensor presents a yield phenomenon by a temperature cycle. A conventional solution is to provide a high concentration impurity diffused layer $p^+$ having the same conductivity as a p-type gauge resistance to extended to a pad portion replacing aluminum wiring. Such a solution is described in JP-B-3-6674.

The conventional technique described above has a large effect of reducing temperature hysteresis since there is no aluminum wiring. On the other hand, however, a normal value of the sheet resistance of the high concentration impurity diffused layer (the $p^+$ layer) is approximately several ten $\Omega/SQ$, which is several hundred times as large as that of aluminum. Thus, when the high concentration impurity diffused layer is extended so as to connect between gauge resistances or between bonding pads, there has been such a problem that the effective sensitivity of the gauge resistance is lowered because the connecting portion is a stress insensitive portion.

Further, a means for widening the $p^+$ layer is conceivable in order to lower the resistance value of the connecting portion, but there has been such a problem in this method that a leakage current between the substrate and the high concentration impurity diffused layer is increased.

SUMMARY OF THE INVENTION

The present invention reduces temperature hysteresis of an output wiring for outputting a resistance state of a resistor without lowering effective sensitivity of the resistor formed on a semiconductor substrate and without increasing a leakage current.

Additionally the present invention reduced temperature hysteresis, in a shielding low resistance material that prevents drift or the like of a resistor formed on a semiconductor substrate.

Also, the present invention avoids hysteresis of an output wiring metal and a shielding metallic film of a resistor formed on a semiconductor substrate by replacing the material quality thereof with a material quality of higher yield stress and using these members within elastic deformation.

Also, in accordance with the present invention, when an output wiring or a shielding resistance material of a resistor is provided in a stress insensitive direction, the substrate for installing them is formed to be small in size.

In order to achieve the above-mentioned objects, according to the present invention, an output wiring for outputting a resistance state of a resistor is provided in a stress insensitive direction on a semiconductor substrate in a sensor for detecting a physical amount in which a resistor is formed on a semiconductor substrate and a resistance state of the resistor is detected.

Further, in a sensor for detecting a physical amount in which a piezogauge resistor is formed on a semiconductor substrate and a resistance state of the resistor is outputted, the piezogauge resistor is covered with a shielding low resistance material and the low resistance material is made of aluminum 5 to 30 nm in thickness.

Furthermore, in a sensor for detecting a physical amount in which a piezogauge resistance is formed on a semiconductor substrate, a substance of high yield stress is used as an output wiring material for outputting the resistance state of the resistor or a shielding low resistance material for resistance shielding.

Further, in order to make the area of the semiconductor substrate of the sensor for detecting the physical amount, the semiconductor substrate is applied with dicing along the stress insensitive direction of the output wiring material or the shielding resistance material.

According to the present invention, even when an aluminum wiring is used as an output wiring for instance, the resistor is not influenced even if the aluminum wiring yields is subjected to a temperature cycle by arranging the aluminum wiring in the stress insensitive direction of the gauge resistance.

Further, it is possible to reduce temperature hysteresis by using a shielding low resistance material in the gauge resistor and making this low resistance material of aluminum 5 to 30 nm in thickness.

Furthermore, the influence by the temperature cycle is limited within elastic deformation by using a material of high yield point as the output wiring material or the shielding low resistance material, and temperature hysteresis does not appear in the sensor output.

Further, according to the present invention, it is possible to use the area of the semiconductor substrate most efficiently by applying dicing along the stress insensitive direction, thereby to aim at high efficiency of a production process.

According to the present invention, it is possible to realize a device showing very small temperature hysteresis even when a normal metallic wiring such as aluminum is used in a sensor for detecting physical amount such as a pressure sensor, a differential pressure sensor or an acceleration sensor. Further, a characteristic of very high reproducibility is obtainable by using this sensor for a differential pressure transmitter or a pressure sensor for automobiles.

DETAILED DESCRIPTION

Figure 1:
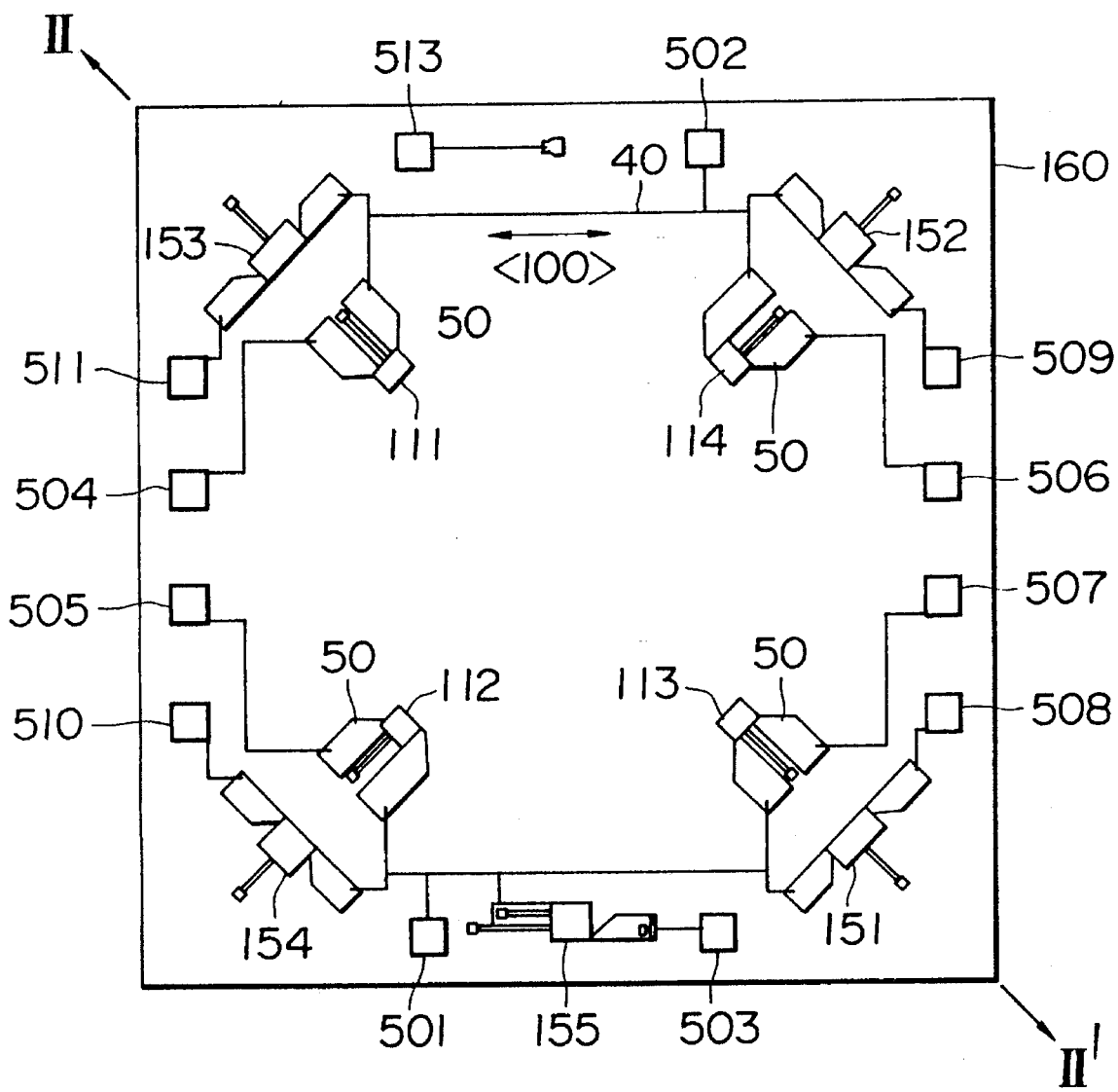
FIG. 1 shows a multiple sensor according to an embodiment of the present invention.
Figure 2:
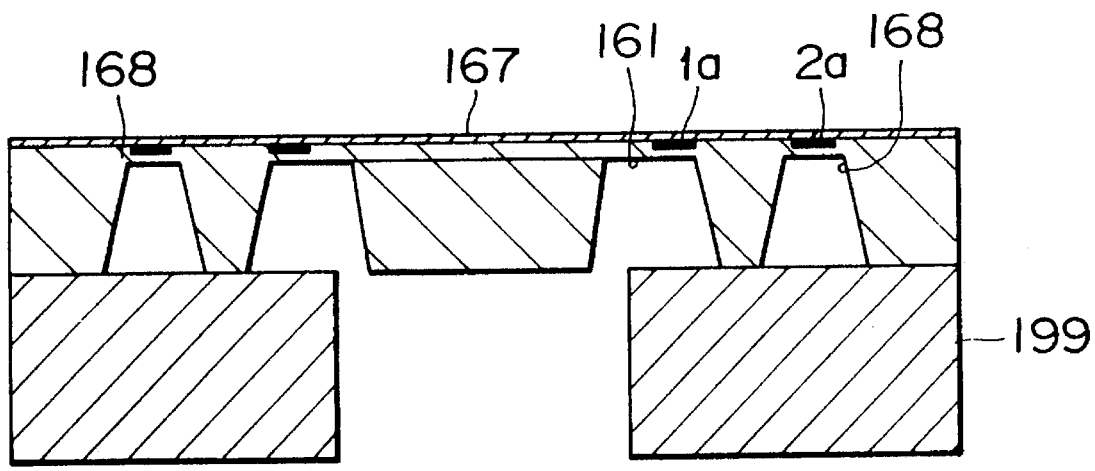
FIG. 2 is a sectional view of the multiple sensor shown in FIG. 1.
Figure 3:
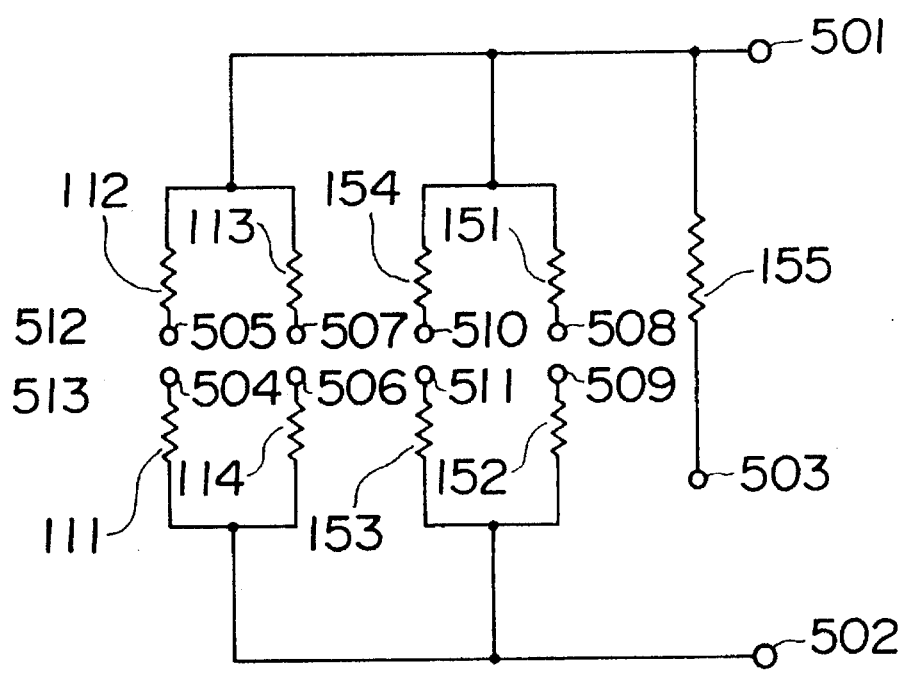
FIG. 3 shows a sensor resistance signal output circuit of an embodiment of the present invention.

FIG. 1 is a plan view of a semiconductor substrate portion of a multiple sensor used in an embodiment of the present invention, FIG. 2 is a sectional view taken along a line II—II' in FIG. 1, and FIG. 3 shows a circuit wiring diagram of each sensor resistance circuit provided on the substrate.

A multiple sensor chip 160 is an n-type single crystal silicon on a {100} plane, and has circular thin wall portion 161 and thick wall portion 167 along an almost central circumference on one surface thereof. The thin wall portion 161 and the thick wall portion 167 described above become a skew field sensing the differential pressure and operate as a pressure sensitive diaphragm for detecting differential pressure by applying first pressure and second pressure to the thin wall portion 161 on the substrate from respective surfaces of the substrate. P-type resistors (gauge resistances) 111 to 114 that are differential pressure sensors are formed in a direction parallel or orthogonal to a crystal axis, respectively, by thermal diffusion or by ion implantation in a <110> axis direction where the piezoresistive coefficient on the {100} plane becomes the maximum on the top surface of the differential pressure sensitive diaphragm. Respective resistors 111 to 114 described above are arranged at positions in the vicinity of fixed portions where distortions in radial directions and tangential directions generated on the differential pressure sensitive diaphragm at time of differential pressure application reach the maximum.

Further, a static pressure sensitive diaphragm 168 sensing the static pressure is formed in the thick wall portion other than the differential pressure sensitive diaphragm, resistors 151 to 154 sensing the static pressure are formed, a temperature sensor 155 is formed with a resistor sensing the temperature, and these elements are connected to form a bridge circuit such as shown in FIG. 3 thereby enabling the device to obtain a large differential pressure signal, a static pressure signal and a temperature signal. The configurations and the wall thicknesses of the differential pressure sensitive diaphragm and the static pressure sensitive diaphragm are set to desired configurations and wall thicknesses in accordance with the sensed differential pressure and static pressure, and are formed by anisotropic wet etching or dry etching.

With this, the resistors 111 to 114 on the differential pressure sensitive diaphragm and the resistors 151 to 154 on the static pressure sensitive diaphragm are subjected to the distortion generated in the diaphragm, and the resistances are changed by the piezoresistance effect. Therefore, it is possible to obtain a signal corresponding to the change of the resistance from pad terminals 504 to 507 and 508 to 511 which are provided for wire bonding a circuit such as shown in FIG. 3 is adopted.

Figure 4:
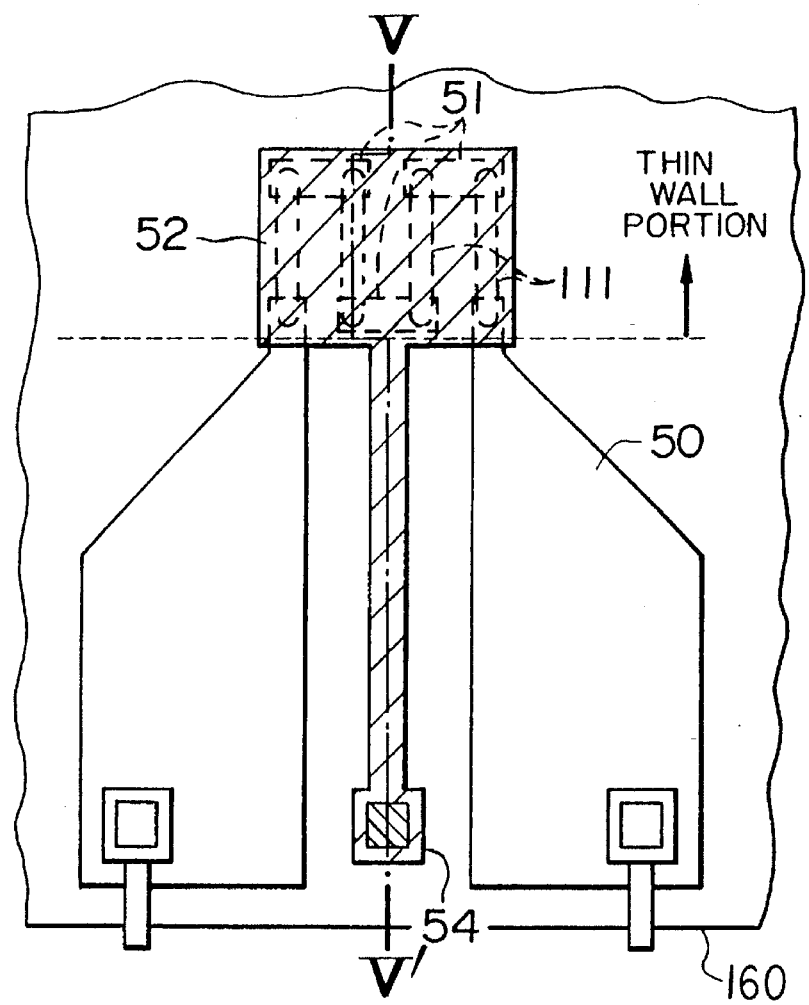
FIG. 4 shows an example of a shielding member structure according to an embodiment of the present invention.

FIG. 4 shows with enlargement a structure of differential pressure, static pressure and temperature resistors shown in FIG. 1.

Figure 5:
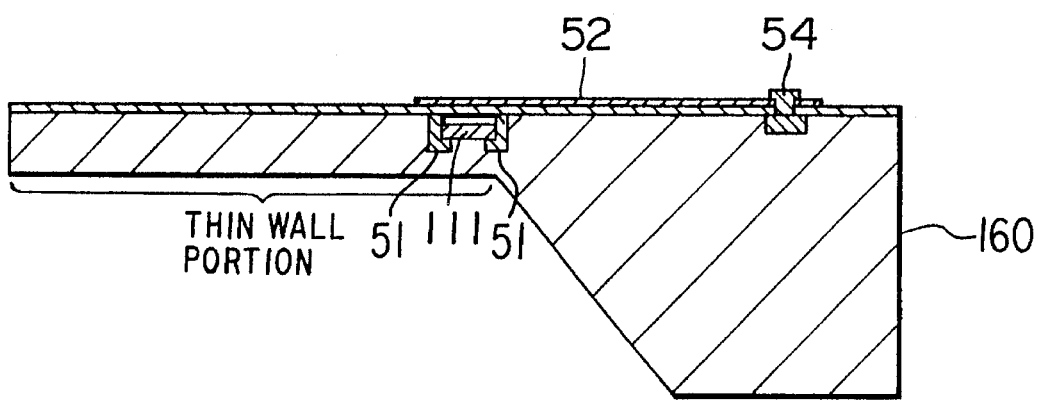
FIG. 5 is a sectional view of a shielding member shown in FIG. 4.

FIG. 5 is a sectional view taken along a line V–V' of the temperature resistor shown in FIG. 4.

The differential pressure sensors 111 to 114, the static pressure sensors 151 to 154 and the temperature sensor 155 all have a structure of a gauge string connected with $p^+$ layers 50 and 51 shown in FIG. 4, but they are displayed herein with box shapes for the sake of simplification. In this example, p-type piezogauge resistances 111 to 114 and 151 to 154 are arranged in the <110> direction using a {001} plane of an n-type silicon substrate, and connected to aluminum wirings 40 with high concentration impurity diffused layers ($p^+$ layers) 50.

Figure 14:
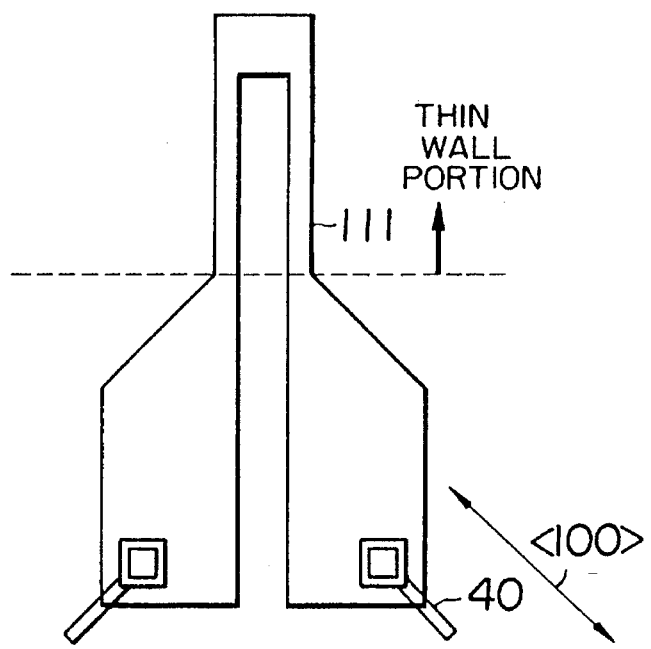
FIG. 14 shows an embodiment of an output wiring method of the present invention.

Further, although the state of the sensor resistor is detected through the high concentration impurity diffused layer ($p^+$ layer) 50 in this embodiment, it is also possible to connect to the sensor resistor 111 directly with the aluminum wiring 40 as shown in the embodiment in FIG. 14 even without an intervening diffused layer.

Figure 6:
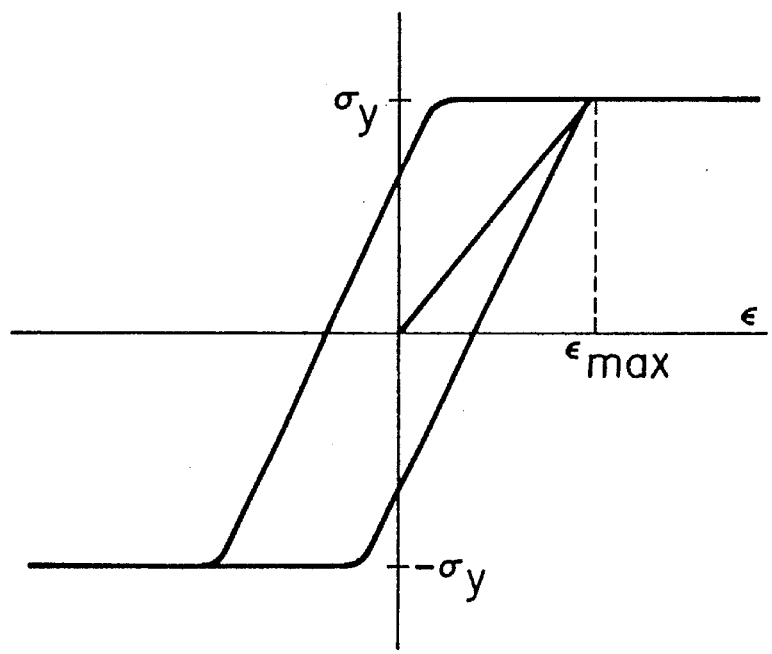
FIG. 6 shows a relationship between distortion and yield stress.

Next, the cause of temperature hysteresis will be described. Since coefficients of thermal expansion of silicon, silicon oxide film and aluminum vary greatly from one another, distortion is generated in aluminum due to temperature change, and aluminum yields when a certain constant distortion $\epsilon_{max}$ is exceeded as shown in FIG. 6. A yield stress $\sigma_y$ at this time reaches approximately 2 MPa. This yield stress is the cause of hysteresis due to temperature cycle.

Figure 7:
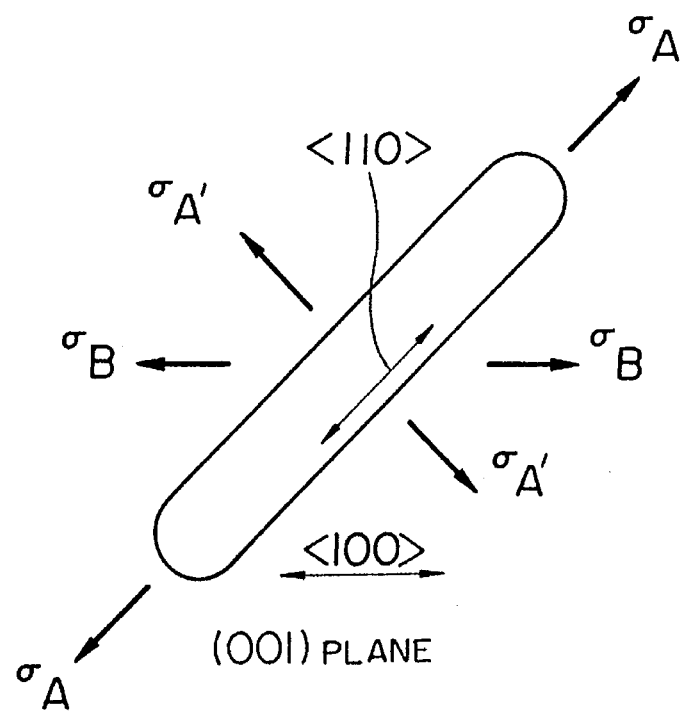
FIG. 7 shows stress acting on gauge resistance.

However, the gauge resistance shows the maximum sensitivity to the stress in the <110> direction, and shows almost no sensitivity in the <100> direction. As a result, a resistance change is shown for stress $\sigma_A$ parallel to the gauge resistance or stress orthogonal $\sigma_A$ thereto as shown in FIG. 7, but no resistance change is shown for stress $\sigma_B$ at an angle of 45° with respect to the gauge resistance because the direction of $\sigma_B$ is parallel to the <100> direction. Accordingly, no change of the resistance value of the gauge resistance is generated by arranging the aluminum wirings 40 in the <100> direction even when the wiring portion includes a primary factor of hysteresis.

Further, by setting the direction of dicing of the semiconductor substrate to a direction corresponding to the direction of the output wiring, for example, by setting the dicing direction also to the <100> direction when the wirings are arranged in the <100> direction as in the present embodiment, it is possible to minimize the chip size of the sensor and to aim at reduction of the cost.

According to the structure of the present invention, the $p^+$ layer is not extended to the length provided in a conventional example of reducing hysteresis. Therefore, there is such an effect that an effective rate of resistance change of the gauge resistance is not impaired, but the leak currentage can also be controlled to be small.

Furthermore, in an embodiment of the present invention shown in FIG. 4, a the top of gauge resistances 111 is covered with shielding aluminum 52 for the purpose of preventing drift or the like so as to drop the potential to that of the substrate. Although it is preferred that the shielding aluminum is extremely thin to reduce temperature hysteresis, if it is too thin and grain boundary formation occur at time of annealing, and gaps are produced among grain boundaries, thus causing electrical disconnection. Therefore, it was found as the result of measurement in experiments that the thickness of 5 to 30 nm was most suitable. Further, since thick aluminum approximately 0.5 to 1 μm in thickness is normally formed at a contact portion 54, this portion causes to create temperature hysteresis when it is near to a thin wall portion on the diaphragm, to the gauge resistance in particular. Therefore, in an embodiment of the present invention, the temperature hysteresis of the aluminum contact portion extending to the gauge resistance is reduced by extending the contact portion 54 to the thick wall portion of the silicon substrate.

Figure 15:
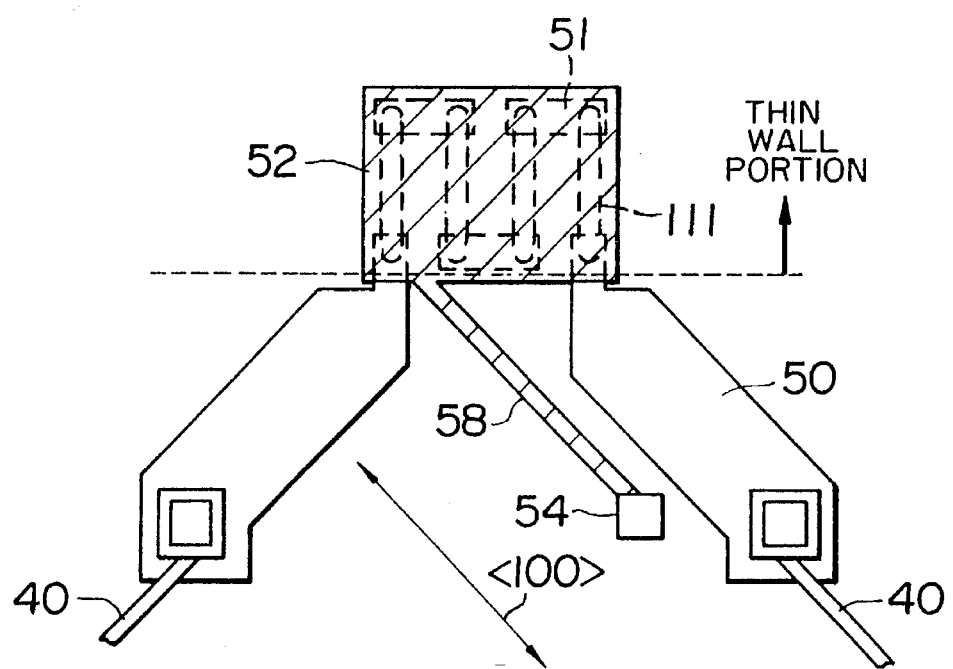
FIG. 15 shows an embodiment of a method of arranging a shielding member of the present invention.

Furthermore, it becomes possible to further reduce temperature hysteresis by providing an outlet portion 58 toward the contact portion 54 in a stress insensitive direction of the semiconductor substrate as shown in FIG. 15 with respect to the shielding low resistance material similarly to the method of installing the sensor resistor.

Figure 16:
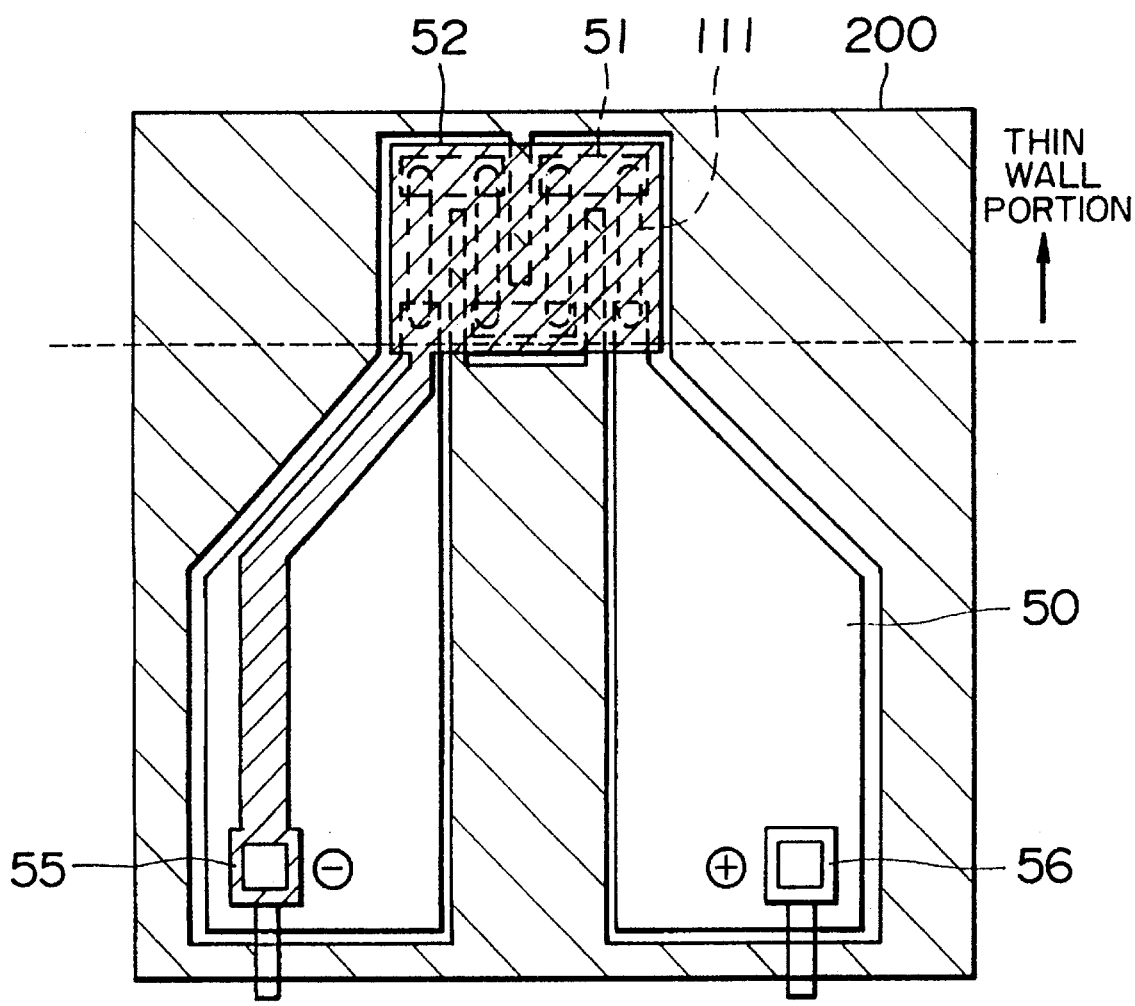
FIG. 16 shows an embodiment of a method of arranging a shielding member of the present invention.

Further, in an embodiment of the present invention shown in FIG. 16, the potential of the shielding aluminum 52 on the gauge resistances 111 is connected to one of wiring contact portions 55 and 56. Since the contact portion 54 with the substrate shown in FIG. 4 can be omitted when such a structure is formed, it is possible to reduce temperature hysteresis. However, when the silicon substrate is of an n-type and the potential of the shielding aluminum 52 is connected to the low potential side, or when the silicon substrate is of a p-type and the potential of the shielding aluminum 52 is connected to the high potential side, there is a fear that spaces among the gauge strings 111 are depleted and inverted, thus bringing about increase of the leakage current. Hence, it is required to insert a high concentration layer 200 having an impurity concentration of $1\times10^{19}/cm^3$ or higher for instance among gauge strings.

Further, it is possible to avoid hysteresis by replacing the material quality of the wiring metal and the shielding metallic film with that of higher yield stress and using it within elastic deformation in order to prevent temperature hysteresis. At this time, it is required that conditions of these materials follow the condition provided for in the following equation.

$$\sigma_y \geq |E_m(\alpha_m - \alpha_{SiO2})\Delta t| \quad (1)$$

Here, $\sigma_y$ represents yield stress, $\alpha_m$ the coefficient of thermal expansion of a wiring material or a shield material, $\alpha_{SiO2}$ the coefficient of thermal expansion of the foundation $SiO_2$ of the wiring material and the shield material, $\Delta t$ a difference between the upper limit and the lower limit of the temperature applied to the sensor, and $E_m$ Young's moduli of the wiring material and the shield material.

To be concrete, titanium (Ti), tungsten (W), molybdenum (Mo), polysilicon or the like satisfies this condition assuming that the use temperature range $\Delta t$ of the sensor is 160° C.

Since $\alpha_m$s of Ti, W and Mo are $9.0\times10^{-6}$, $4.5\times10^{-6}$ and $5.5\times10^{-6}$/°C. and $E_m$s are $1.0\times10^4$, $3.5\times10^4$ and $3.0\times10^4$ Kg/mm$^2$, respectively, generated stresses become 10, 7 and 11 Kg/mm$^2$, respectively, when $\Delta t=160°$ C., which are smaller than yield stresses 25, 40 and 30 Kg/mm$^2$. Further, in the case of polysilicon, $\alpha_m \approx \alpha_{sio}$. Therefore, the generated stress becomes very small, and falls within elastic deformation.

Figure 8:
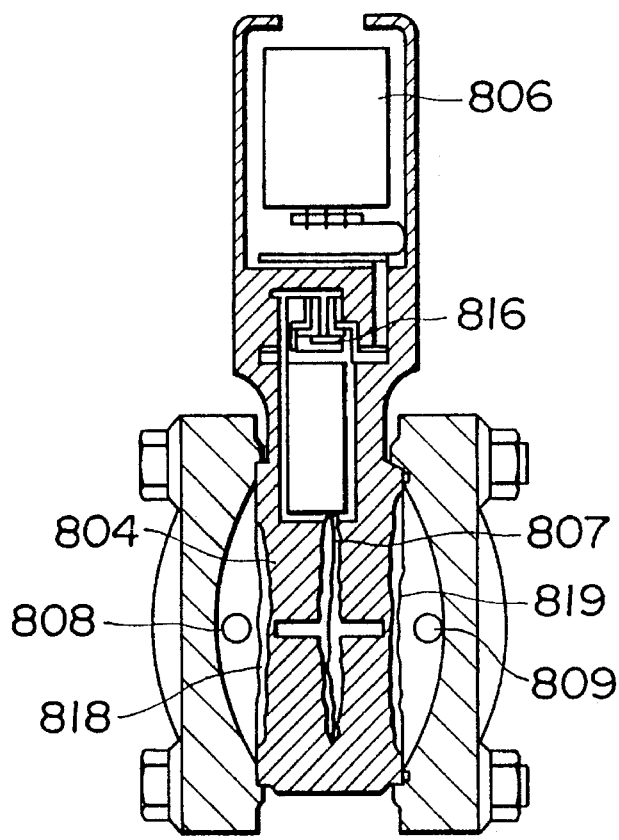
FIG. 8 shows a differential pressure transmitter provided with a multiple sensor of the present invention.

FIG. 8 shows an example of a differential pressure transmitter of a process state detector using a multiple sensor that is an embodiment of the present invention. In FIG. 8, 816 represents a multiple sensor obtained by integrating a differential pressure sensor, a static pressure sensor and a temperature sensor, 804 represents a transmitter body, and 807 represents a center diaphragm for separating the high pressure side and the low pressure side from each other. The external pressure guided through pressure inlets 808 and 809 are received by seal diaphragms 818 and 819 and transmitted to the multiple sensor 816. The multiple sensor outputs signals generally proportionate to the differential pressure, the static pressure and the temperature, respectively, to a signal processing portion.

Figure 9:
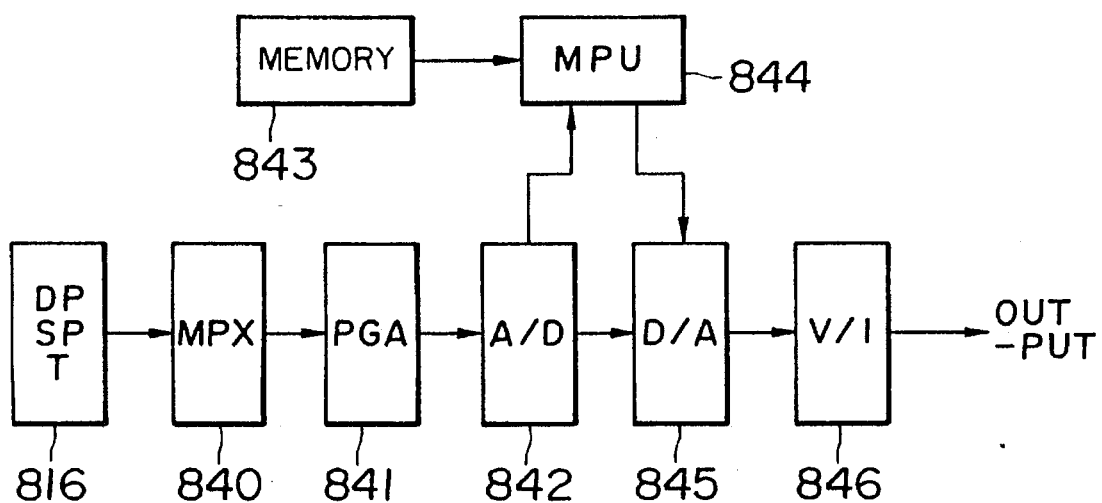
FIG. 9 shows a signal processing circuit of the differential pressure transmitter shown in FIG. 8.

Next, signal processing will be described with reference to FIG. 9. The bridge voltage of the differential pressure sensor, the static pressure sensor and the temperature sensor included in the multiple sensor 816 is outputted, taken in selectively by means of a multiplexer 840 and amplified by a programmable gain amplifier (PGA) 841. Next, the bridge voltage is converted into a digital signal by an A/D converter 842, and transmitted to a microcomputer 844. Respective characteristics of the differential pressure, static pressure and temperature sensors have been stored in advance in a memory 843, and the sensor output is computed with correction by the microcomputer 844 using these data so as to obtain the differential pressure, the static pressure and the temperature with high precision. The computed differential pressure value, static pressure value and temperature value are converted again into analog signals by a D/A converter 845. Further, although it is not shown, a highly precise analog signal, digital signal and a signal superposed with an analog-digital signal each of which represents the process states detected from the transmitter via directly through a voltage-current inverter 846 is outputted. In such a manner, it is possible to realize a transmitter having no hysteresis and very high reproducibility by using the multiple sensor of the present invention.

Figure 10:
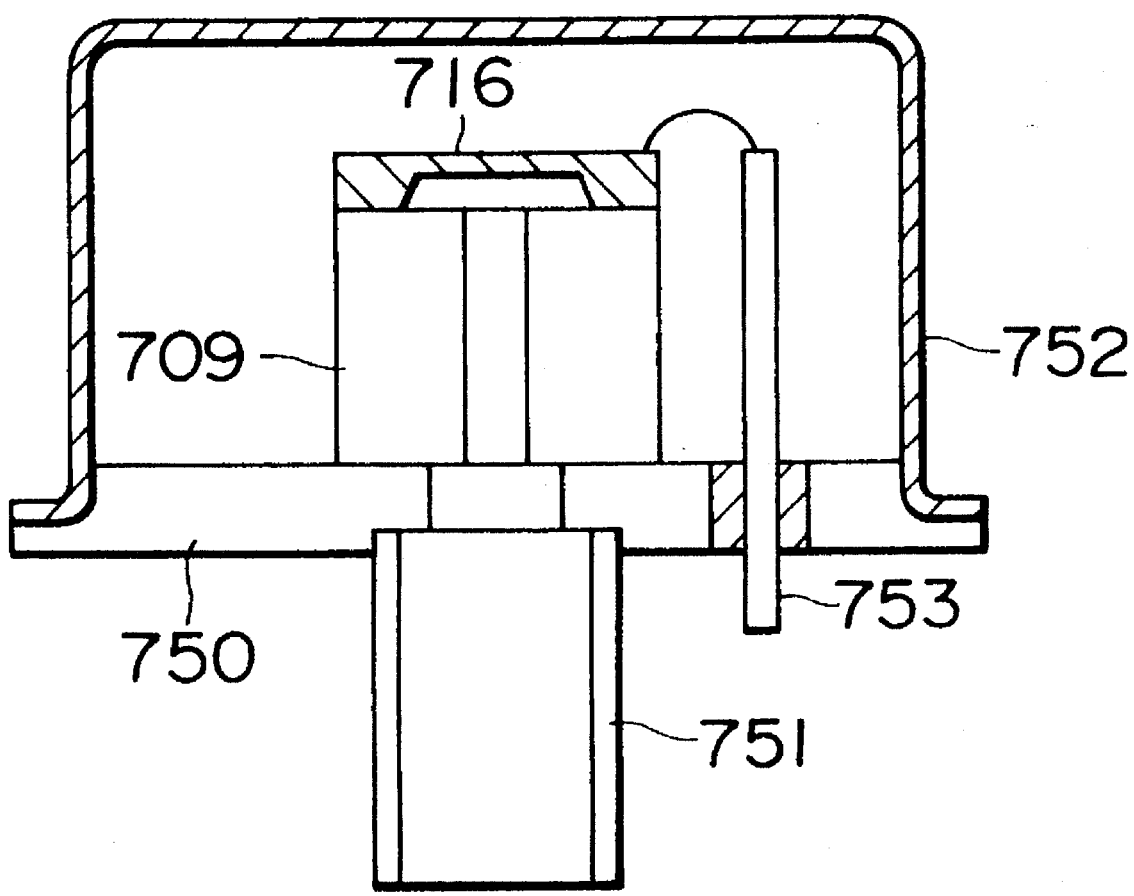
FIG. 10 shows a pressure sensor for automobiles provided with a multiple sensor of the present invention.

FIG. 10 shows an embodiment in which a sensor of the present invention is applied to a pressure sensor for automobiles. Since the sensor for automobiles is used in a wide temperature range from minus several ten degrees to approximately 100 degrees, stabilized temperature characteristics are required. In FIG. 10, 716 represents a pressure sensor of the present invention, 709 a base made of PYREX glass or the like, 750 a base of a can package, 752 a can package for protecting the sensor against the open air, 751 a pressure inlet pipe and 753 a terminal for taking out the output. It is possible to realize a pressure sensor for automobiles that has very high output reproducibility for a wide temperature range similarly to a transmitter by using a pressure sensor of the present invention.

Figure 11:
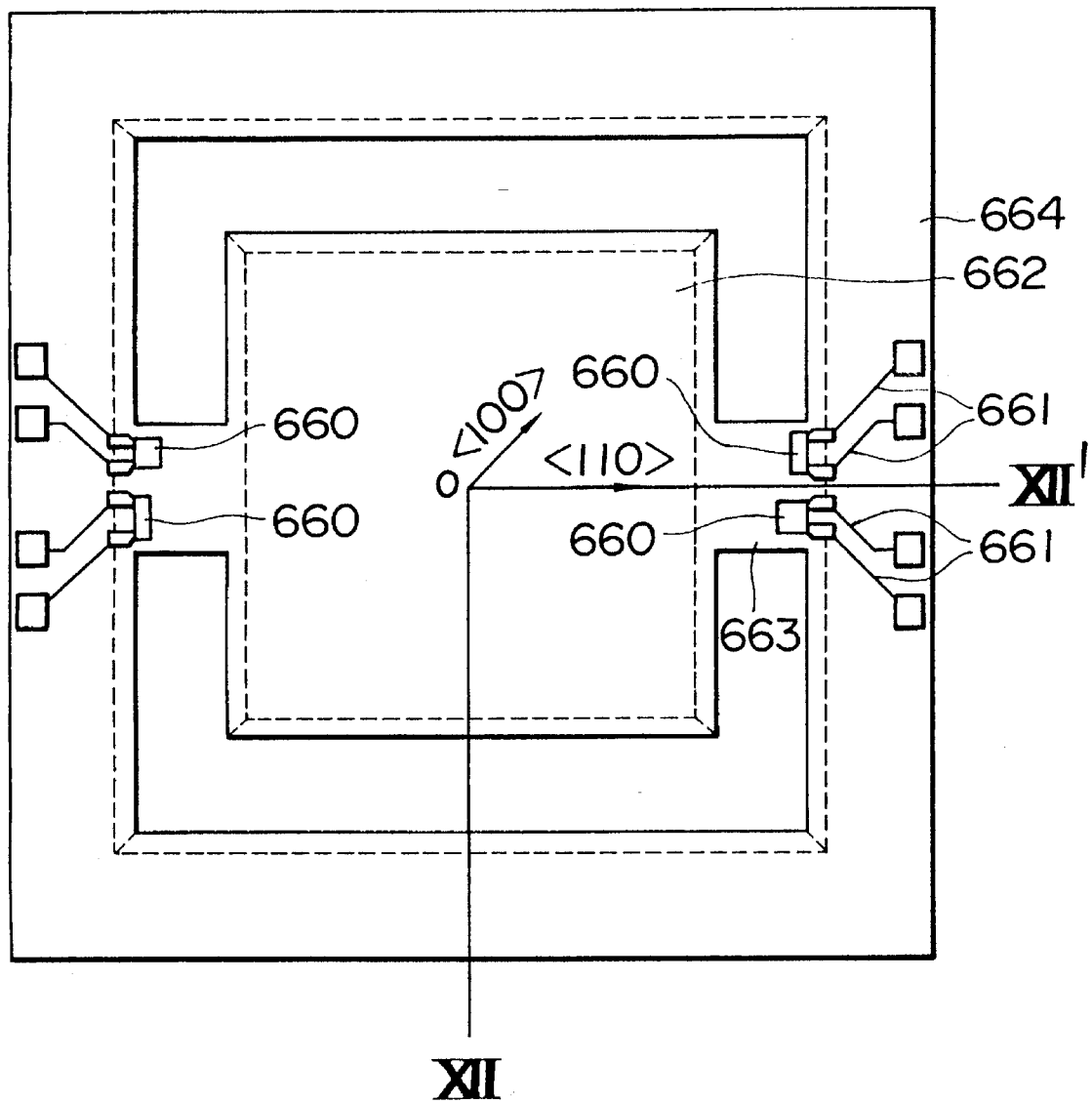
FIG. 11 shows an acceleration sensor according to an embodiment of the present invention.

FIG. 11 shows an application example of an acceleration sensor 664 made by applying anisotropic etching to {001} plane silicon as an embodiment of the present invention. The acceleration sensor 664 is composed of piezogauge resistances 660, aluminum wiring portions 661, movable mass 662, and beam portions 663 made thinner by etching etc. or the like. When acceleration acts on this sensor, the movable mass 662 moves up and down and large stress is produced at end portions of the beam, which is detected with the piezogauge resistance. It is also possible for this acceleration sensor to reduce temperature hysteresis by arranging aluminum wirings in the <100> direction as output wirings.

Figure 12:
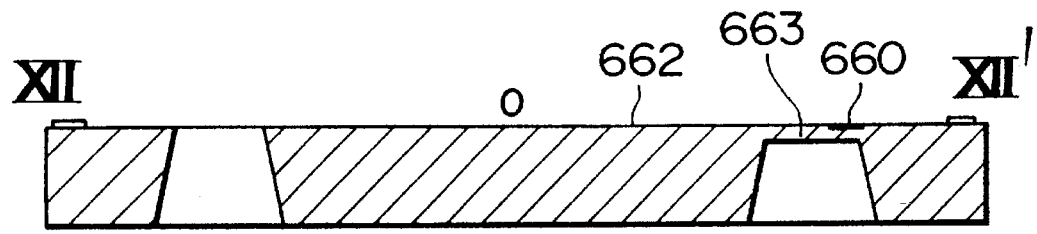
FIG. 12 is a sectional view of the acceleration sensor shown in FIG. 11.

FIG. 12 is a sectional view taken along a line XII–XII' in FIG. 11.

Figure 13:
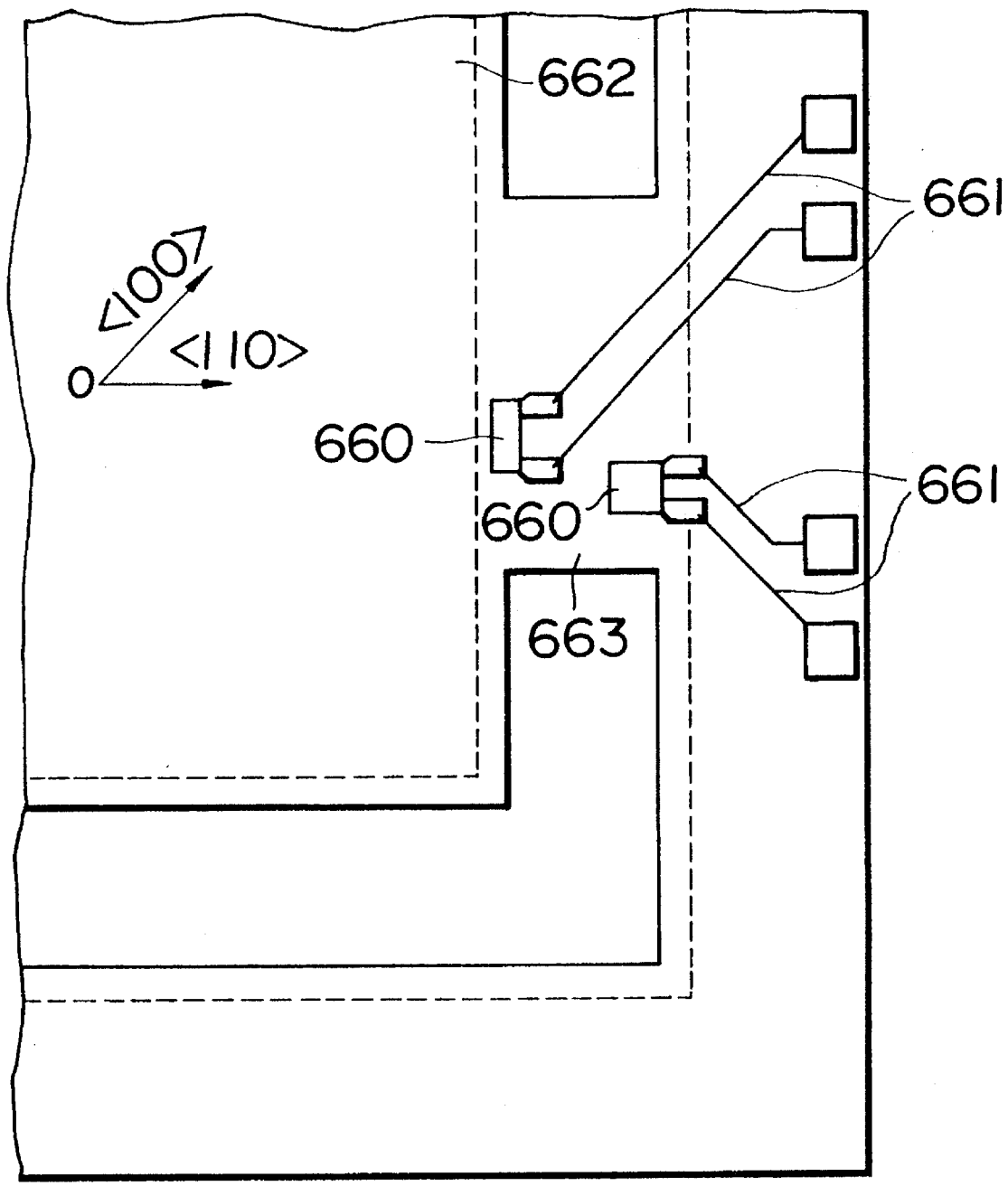
FIG. 13 shows an embodiment of an output wiring method of the present invention.

FIG. 13 shows a modification of the acceleration sensor shown in FIG. 11. Respective structural portions have the same structures as those shown in FIG. 11 in an embodiment of the present invention, but,.when the piezogauge resistances 660 are formed in a portion of the beam portion 663 closer to the center, the aluminum wirings are provided along the stress insensitive direction <100> of the substrate as heretofore described as the output wirings in the portion made thinner. There is an effect of reducing temperature hysteresis also in an easily movable portion such as the thin wall portion of the acceleration sensor or the thin wall portion of the multiple sensor shown in FIG. 1 by providing aluminum wirings in accordance with the output wiring method of the present invention.

What is claimed is:

1. A sensor for detecting a physical amount comprising:
   at least one resistor formed on a semiconductor substrate; and
   an output wiring connected to said at least one resistor and disposed in a stress insensitive direction of said semiconductor substrate whereby a resistance state of said at least one resistor is ascertainable via said output wiring.

2. A sensor for detecting physical amount according to claim 1, further comprising an output terminal provided on said semiconductor substrate and connected to said output wiring.

3. A sensor for detecting physical amount according to claim 1, wherein two or more of said resistors are provided on said semiconductor substrate, and said output wiring combines said two or more of said resistors.

4. A sensor for detecting physical amount according to claim 3, wherein a Wheatstone bridge is formed of said two or more of resistors.

5. A sensor for detecting physical amount according to claim 1, wherein said resistor detects a differential pressure state.

6. A sensor for detecting physical amount according to claim 1, wherein said resistor detects a static pressure state.

7. A sensor for detecting physical amount according to claim 1, wherein said resistor detects an acceleration state.

8. A sensor for detecting physical amount according to claim 1, wherein said resistor detects a temperature state.

9. A sensor for detecting a physical amount comprising:
   at least one resistor formed on a semiconductor substrate; and
   an output wiring connected to said at least one resistor and disposed in a stress insensitive direction of said semiconductor substrate whereby a resistance state of said at least one resistor is ascertainable via said output wiring; and
   wherein said semiconductor substrate comprises a {011} plane silicon substrate, said at least one resistor comprises a piezogauge resistance arranged in a <110> direction on said semiconductor substrate, and said output wiring is provided in a <100> direction.

10. A sensor for detecting a physical amount comprising:
    at least one resistor formed on a semiconductor substrate; and
    an output wiring connected to said at least one resistor and disposed in a stress insensitive direction of said semiconductor substrate whereby a resistance state of said at least one resistor is ascertainable via said output wiring; and
    wherein said semiconductor substrate comprises a {011} plane silicon substrate, said at least one resistor comprises a piezogauge resistance arranged in a <110> direction on said semiconductor substrate, and said output wiring is provided in a <100> direction.

11. A sensor for detecting a physical amount comprising:
    a piezogauge resistor formed on a semiconductor substrate;
    a shielding low resistance member composed of aluminum 5 to 30 nm in thickness provided so as to cover said piezogauge resistor; and
    a resistance state output coupled to said piezogauge resistor.

12. A sensor for detecting physical amount according to claim 11, wherein an n-type silicon substrate is used as said semiconductor substrate, and a p-type resistor is used as said piezogauge resistor.

13. A sensor for detecting physical amount according to claim 12, wherein a diaphragm is formed in said semiconductor substrate, said resistor is provided in the neighborhood of a thin wall portion of said diaphragm, a contact portion between said shielding low resistance material and said semiconductor substrate is provided in a thick wall portion of said semiconductor substrate and said shielding low resistance material is made to show a potential equal to the potential of said semiconductor substrate.

14. A sensor for detecting physical amount according to claim 13, wherein a connecting direction of said shielding low resistance material to said contact portion is provided in a stress insensitive direction of said semiconductor substrate.

15. A sensor for detecting physical amount according to claim 14, wherein a {001} plane silicon substrate is used as said semiconductor substrate, and a connecting direction of said low resistance material to said contact portion is provided in a <100> direction.

16. A sensor for detecting a physical amount comprising:
    a semiconductor substrate in which a direction of dicing the semiconductor substrate is set to a stress insensitive direction of said semiconductor substrate;
    a resistor formed on said semiconductor substrate; and
    an output wiring provided in a stress insensitive direction of said semiconductor substrate outputting a resistance state of said resistor;
    wherein said semiconductor substrate comprises a {001} plane silicon substrate, said resistor comprises a piezogauge resistance arranged in a <110> direction on said semiconductor substrate, a wiring for outputting a resistance state of said piezogauge resistance is provided in a <100> direction, and said dicing direction is set to the <100> direction.

17. A sensor for detecting physical amount comprising:
    a piezogauge resistor formed on a semiconductor substrate; and
    means for outputting a resistance state of said piezogauge resistor; wherein:
    a low resistance material that satisfies the following expression:

$$\sigma_y \geq |E_m(\alpha_m - \alpha_{SiO2})\Delta t|$$

when it is assumed that $\sigma_y$ represents yield stress of a wiring material for outputting a resistance state of said resistor or a shield material for shielding the resistance, $\alpha_m$ the coefficient of thermal expansion thereof, $\alpha_{SiO2}$ the coefficient of thermal expansion of the foundation $SiO_2$ of the wiring material and the shield material, $\Delta t$ a difference between the upper limit and the lower limit of the temperature applied to the sensor, and $E_m$ Young's moduli of the wiring material and the shield material, is used for said wiring material and said shield material.

18. A sensor for detecting physical amount according to claim 17, wherein the shield material is composed of Ti, W, Mo or polysilicon.

* * * * *

UNITED STATES PATENT AND TRADEMARK OFFICE
CERTIFICATE OF CORRECTION

PATENT NO. : 5,537,882
DATED : July 23, 1996
INVENTOR(S) : Seiichi Ugai, et al.

It is certified that error appears in the above-indentified patent and that said Letters Patent is hereby corrected as shown below:

IN THE ABSTRACT, line 4: Change "Such" to --such--.

| Column | Line | |
|---|---|---|
| 1 | 21 | Change "extended" to --extend--. |
| 1 | 49 | Change "reduced" to --reduces--. |
| 1 | 50 | After "hysteresis" delete ",". |
| 4 | 67 | After "thin" insert --cohesion--. |
| 5 | 62 | Change "$\alpha_m \neq \alpha_{sio}.$" to --$\alpha_m \neq \alpha_{sio}.$--. |
| 6 | 67 | After "but," delete ".". |

Signed and Sealed this

Thirty-first Day of December, 1996

Attest:

BRUCE LEHMAN

Attesting Officer       Commissioner of Patents and Trademarks